(12) United States Patent
Lee

(10) Patent No.: US 6,231,179 B1
(45) Date of Patent: May 15, 2001

(54) METHOD AND DEVICE FOR COUPLING SPECTACLES AND CLIP-ON SUN-SHADES WITH EACH OTHER

(75) Inventor: Suk Jae Lee, 850, Chim-San 1 Dong, Buk-Gu, Taegu (KR)

(73) Assignees: Suk Jae Lee; Ju Jae Lee, both of Taegu (KR)

( * ) Notice: Subject to any disclaimer, the term of this patent is extended or adjusted under 35 U.S.C. 154(b) by 0 days.

(21) Appl. No.: 09/458,711

(22) Filed: Dec. 10, 1999

(30) Foreign Application Priority Data

Oct. 23, 1999 (KR) .................................................. 99-22922

(51) Int. Cl.[7] .................................................. G02C 9/00
(52) U.S. Cl. .................................................. 351/47; 351/57
(58) Field of Search .................................. 351/47, 57, 48, 351/58, 44, 41

(56) References Cited

U.S. PATENT DOCUMENTS

| | | | |
|---|---|---|---|
| 5,936,700 | * 8/1999 | Masunaga | 351/47 |
| 5,975,691 | * 11/1999 | Ku | 351/47 |
| 6,012,811 | * 1/2000 | Chao et al. | 351/47 |
| 6,116,732 | * 9/2000 | Xiao | 351/47 |

* cited by examiner

Primary Examiner—Hung Xuan Dang
(74) Attorney, Agent, or Firm—Jacobson, Price, Holman & Stern, PLLC

(57) ABSTRACT

Disclosed is a method and a device for coupling spectacles and clip-on sun-shades with each other, the spectacles having first lens frames connected together at their inner ends by a first nose frame, lenses fitted into respective first lens frames and arms mounted to outer ends of the first lens frames through hinges, the clip-on sun-shades having second lens frames connected together at their inner ends by a second nose frame and tinted lenses fitted into respective second lens frames. The device comprises a permanent magnet disposed to one of the spectacles and the clip-on sun-shades at a predetermined position; and a soft magnetic member disposed to the other of the spectacles and the clip-on sun-shades at a preset position in a manner such that the soft magnetic member can be mated with the permanent magnet thereby to couple the spectacles and the clip-on sun-shades with each other.

8 Claims, 10 Drawing Sheets

METHOD AND DEVICE FOR COUPLING SPECTACLES AND CLIP-ON SUN-SHADES WITH EACH OTHER

BACKGROUND OF THE INVENTION

1. Field of the Invention

The present invention relates to a method and a device for coupling spectacles and clip-on sun-shades with each other, and more particularly, the present invention relates to a method and a device for coupling spectacles and clip-on sun-shades with each other, which enable sunglasses referred to as "clip-on sun-shades" not having arms to be detachably coupled to spectacles.

2. Description of the Related Art

Generally, spectacles are used for the purpose of enhancing eyesight of a person who has defective vision. Sunglasses help to protect the eyes from strong light which may cause damage to the eyes. Ordinary spectacles comprise lens frames connected together at their inner ends by a nose frame, lenses fitted into respective lens frames, and arms mounted to outer ends of the lens frames through hinges.

Eyesight is divided into normal eyesight, nearsightedness, farsightedness and astigmatism. If incoming parallel lights are imaged such that an image is focused in front of the retina, nearsightedness (myopia) exists, whereby an observer can properly view close objects, but poorly view distant objects. By utilizing concave lenses as lenses of spectacles, nearsightedness can be adequately corrected. If incoming parallel lights are imaged such that an image is focused behind the retina, farsightedness (hyperopia) exists, whereby an observer can poorly view close objects, but properly view distant objects. In the case of astigmatism, due to the fact that a spherical surface of the eyeball, especially the cornea, is not even, incoming parallel lights cannot be focused directly to a point on the retina, whereby an observer cannot properly focus his eyesight.

While, as described above, spectacles are used for enhancing eyesight of a person who has defective vision, in a hot summer weather when ultraviolet rays dominate, a spectacle wearer must prepare separate sunglasses.

In other words, unlike non-prescription sunglasses which are worn by persons who do not have vision defects, in the case of persons who wear spectacles due to an ocular refractive error, separate sunglasses having vision-corrective lenses of a power which corresponds to that of the user's normal spectacle lenses, must be used, whereby cost is increased.

To cope with this problem, clip-on sun-shades which do not have arms and to which tinted lenses are mounted, are attached in front of the spectacles, thereby to render the same vision enhancing effect as can be achieved by wearing the conventional vision-corrective sunglasses having arms.

Figure 9:
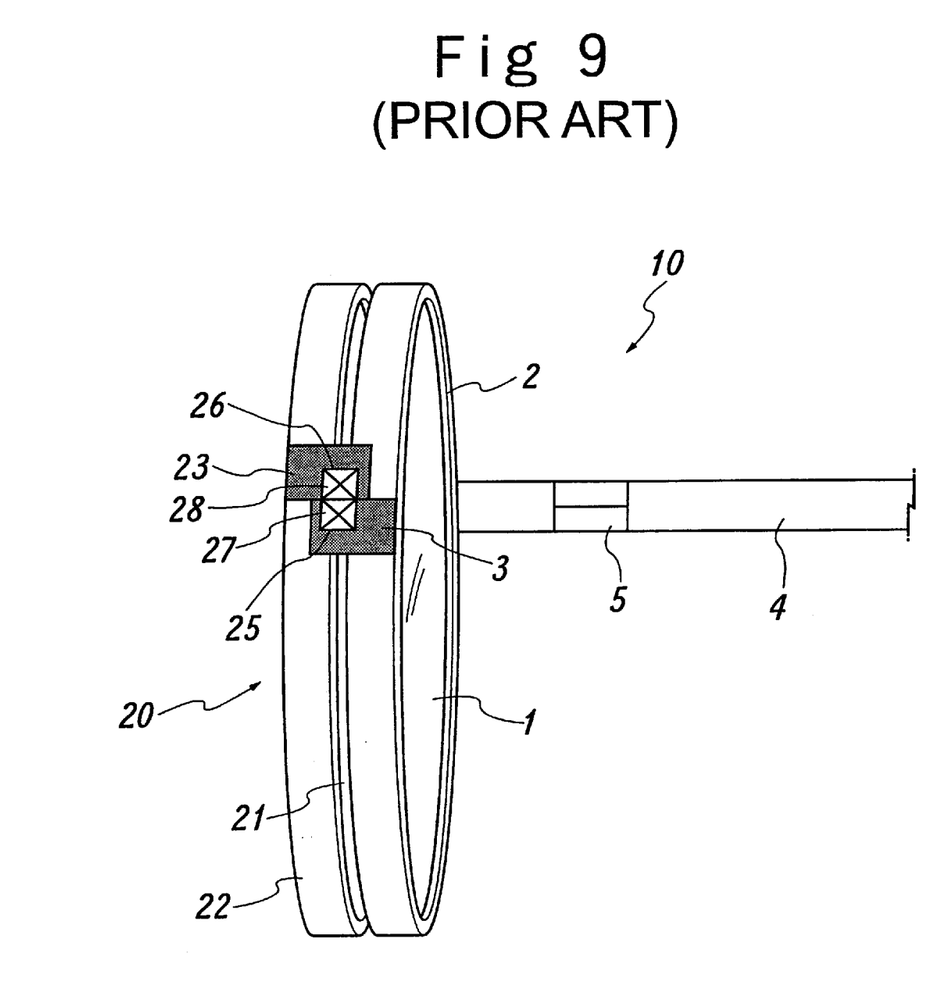
FIG. 9 is a cross-sectional view illustrating a state wherein spectacles and clip-on sun-shades according to the conventional art are coupled with each other.

Referring to FIG. 9, there is shown a cross-sectional view illustrating a state wherein spectacles and clip-on sun-shades according to the conventional art are coupled with each other. The spectacles 10 has first lens frames 2 which are connected together at their inner ends by a first nose frame 3, lenses 1 which are fitted into respective first lens frames 2, and arms 4 which are mounted to outer ends of the first lens frames 2 through hinges 5. The clip-on sun-shades 20 have second lens frames 22 which are connected together at their inner ends by a second nose frame 23, and tinted lenses 21 which are fitted into respective second lens frames 22.

In order to couple the spectacles 10 and the clip-on sun-shades 20 with each other, the first nose frame 3 of the spectacles 10 and the second nose frame 23 of the clip-on sun-shades 20 are formed with accommodating grooves 25 and 26, respectively, and permanent magnets 27 and 28 are inserted into the accommodating grooves 25 and 26, respectively, whereby the clip-on sun-shades 20 are stably coupled to the spectacles 10 by virtue of magnetic force of the permanent magnets 27 and 28.

However, the above-described coupling structure between the spectacles 10 and the clip-on sun-shades 20 suffers from defects in that, since the accommodating grooves 25 and 26 for receiving the permanent magnets 27 and 28 must be defined in the spectacles 10 and the clip-on sun-shades 20, respectively, sizes of the first and second nose frames 3 and 23 are enlarged, and limitations are imposed on design freedoms for the spectacles 10 and the clip-on sun-shades 20. Moreover, due to weight of the first and second nose frames 3 and 23 and the permanent magnets 27 and 28 which have enlarged sizes, the entire weight of the combination including the spectacles 10 and the clip-on sun-shades 20 is increased, and wearing comfortableness is deteriorated.

In addition, due to the fact that the permanent magnets 27 and 28 should be mounted to the first and second nose frames 3 and 23 of the spectacles 10 and the clip-on sun-shades 20, respectively, assembling operations must be carefully performed while paying attention to directional characteristics of the permanent magnets 27 and 28 depending upon magnetic poles, whereby assemblability is degraded and productivity is diminished. In the worst case, if the permanent magnets 27 and 28 are misassembled, it is impossible to couple the clip-on sun-shades 20 to the spectacles 10.

Figure 10:
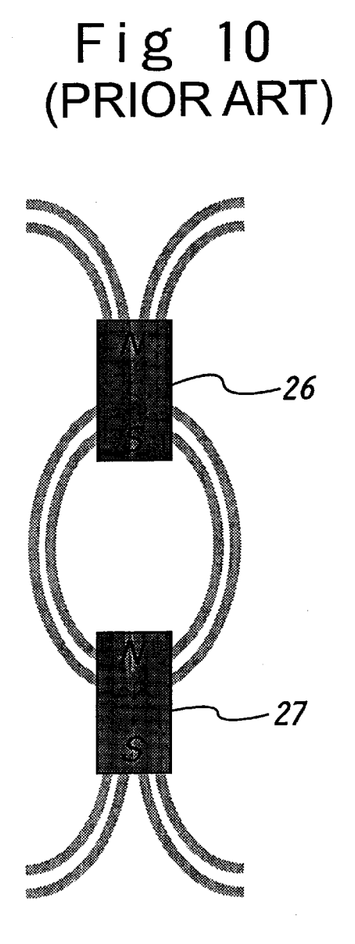
FIG. 10 is a view illustrating magnetic flux distribution between the spectacles and the clip-on sun-shades which are coupled with each other according to the conventional art.

In particular, as shown in FIG. 10 which is a view illustrating magnetic flux distribution between the spectacles 10 and the clip-on sun-shades 20, in the case that the spectacles 10 and the clip-on sun-shades 20 are coupled with each other using the pair of permanent magnets 27 and 28, the North and South poles N and S of the permanent magnets 27 and 28, which adjoin to each other, are properly coupled with each other by attractive force generated therebetween. However, because magnetic force which is generated in the North and South poles N and S of the permanent magnets 27 and 28, which are opposed to each other is maintained in an opened status, the magnetic force is dissipated and lost to the outside, whereby coupling force between the spectacles 10 and the clip-on sun-shades 20 is remarkably reduced.

SUMMARY OF THE INVENTION

Accordingly, the present invention has been made in an effort to solve the problems occurring in the related art, and an object of the present invention is to provide a method and a device for coupling spectacles and clip-on sun-shades with each other, which enable the spectacles and clip-on sun-shades to be easily coupled with each other, manufacturing and assembling procedures of coupling means to be simplified, costs of the spectacles and clip-on sun-shades to be reduced, and design freedoms for the spectacles and clip-on sun-shades to be improved, thereby enhancing productivity and quality of the spectacles and clip-on sun-shades, preventing the clip-on sun-shades coupled to the spectacles from being undesirably uncoupled from the spectacles and improving user convenience.

In order to achieve the above object, according to one aspect of the present invention, there is provided a device for coupling spectacles and clip-on sun-shades with each other, the spectacles having first lens frames connected together at their inner ends by a first nose frame, lenses fitted into respective first lens frames and arms mounted to outer ends of the first lens frames through hinges, the clip-on sun-shades having second lens frames connected together at their inner ends by a second nose frame and tinted lenses fitted into respective second lens frames, the device comprising: a permanent magnet disposed to either one of the spectacles or the clip-on sun-shades at a predetermined position; and a soft magnetic member disposed to the other of the spectacles or the clip-on sun-shades at a preset position in a manner such that the soft magnetic member can be mated with the permanent magnet thereby to couple the spectacles and the clip-on sun-shades with each other.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
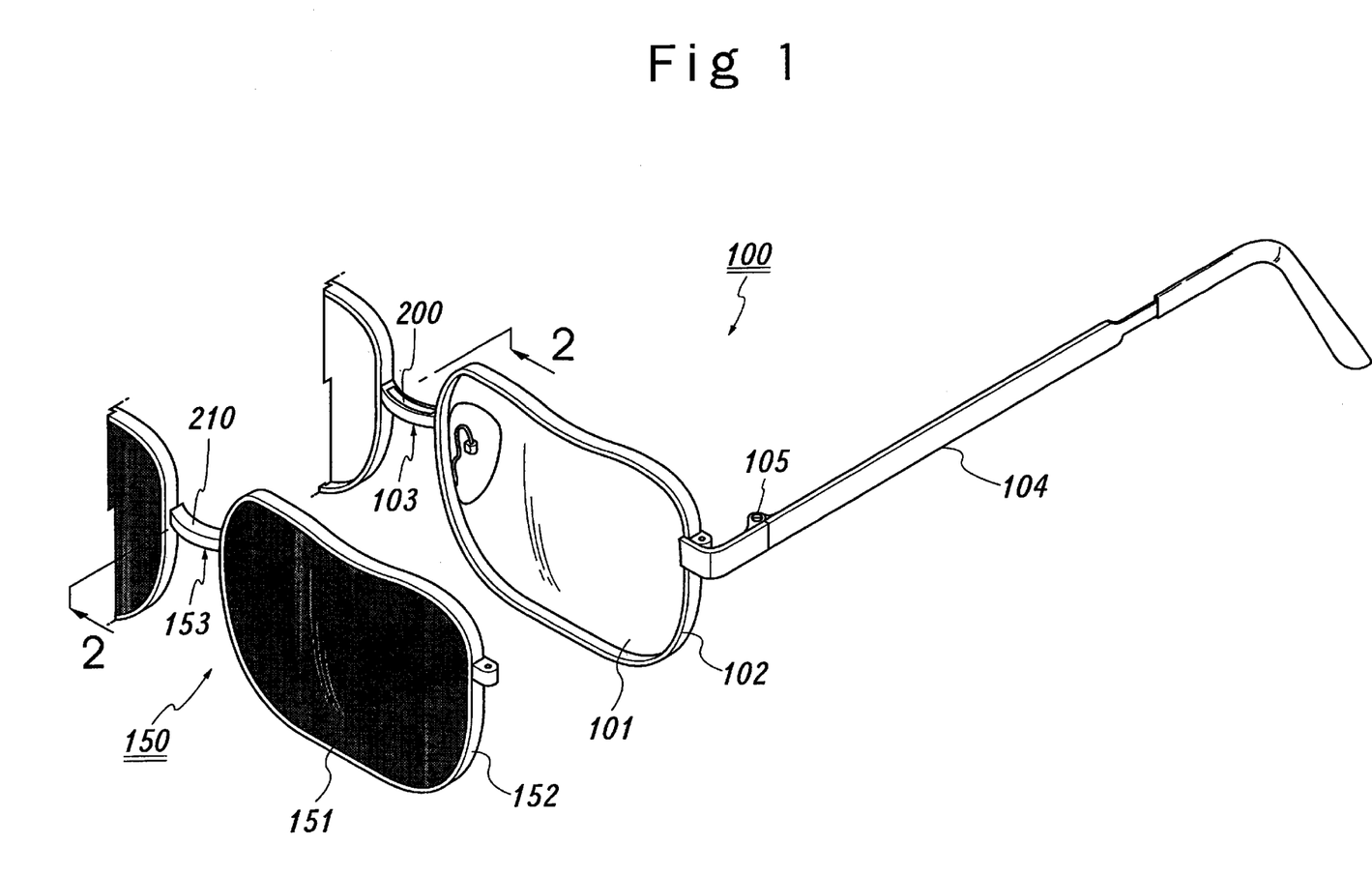
FIG. 1 is an exploded perspective view illustrating spectacles and clip-on sun-shades in accordance with a first embodiment of the present invention.
Figure 2:
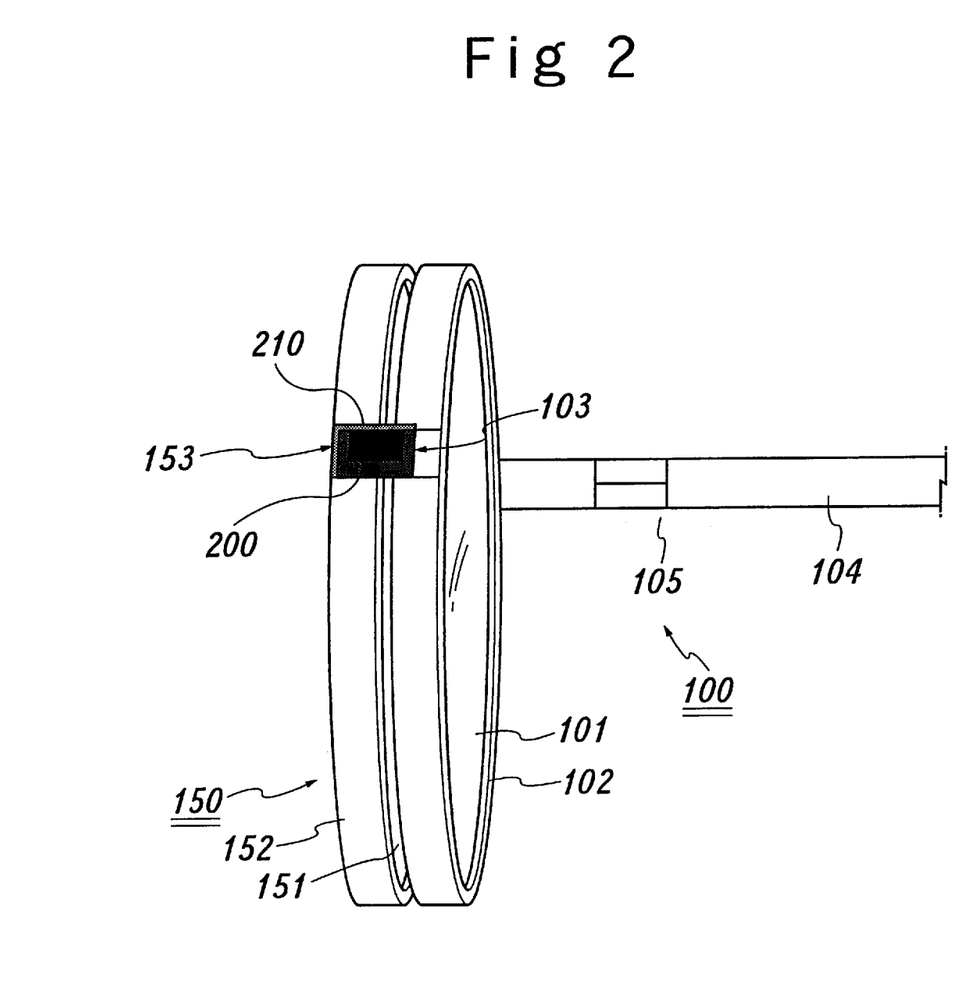
FIG. 2 is a cross-sectional view taken along the line A—A of FIG. 1, illustrating a state wherein the spectacles and the clip-on sun-shades are coupled with each other.
Figure 3:
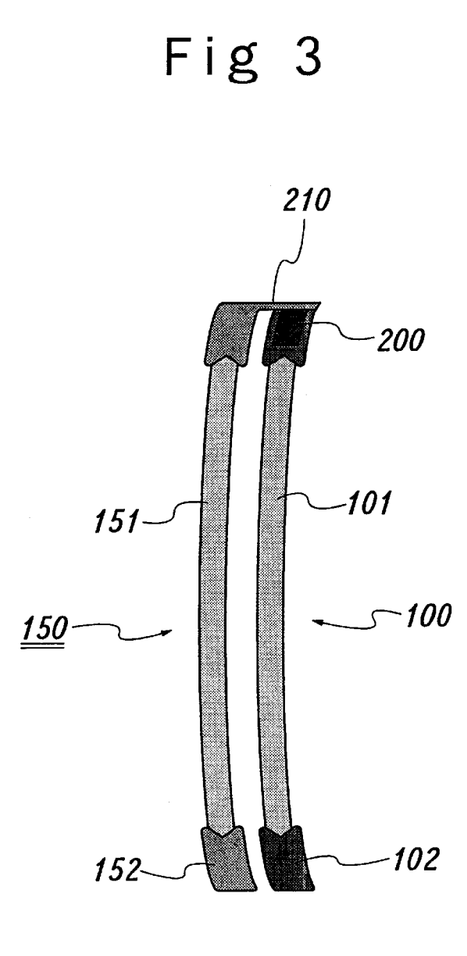
FIG. 3 is a cross-sectional view illustrating a state wherein spectacles and clip-on sun-shades in accordance with a second embodiment of the present invention are coupled with each other.
Figure 4A:
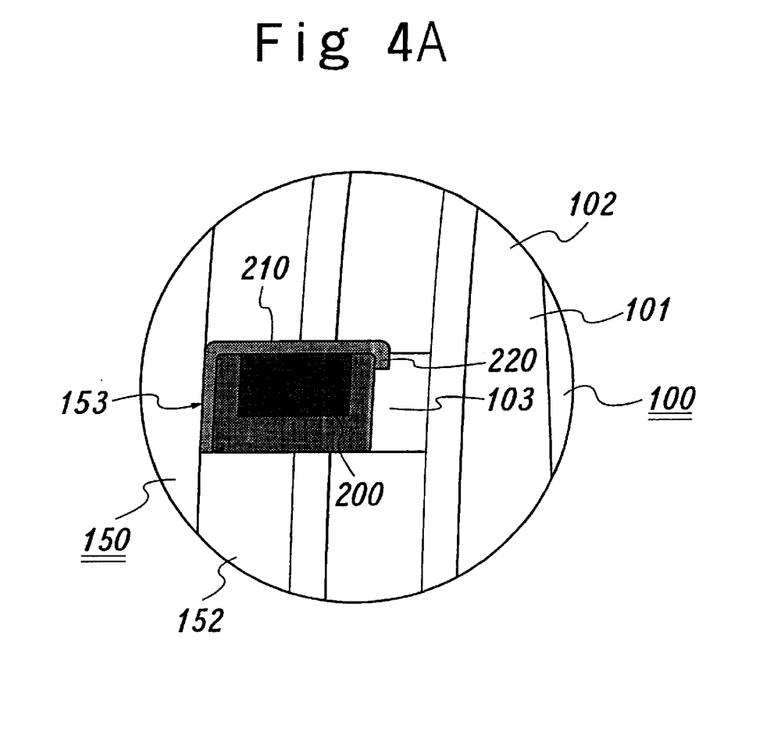
FIGS. 4A and 4B are enlarged cross-sectional views each illustrating a state wherein spectacles and clip-on sun-shades in accordance with a third embodiment of the present invention are coupled with each other.
Figure 4B:
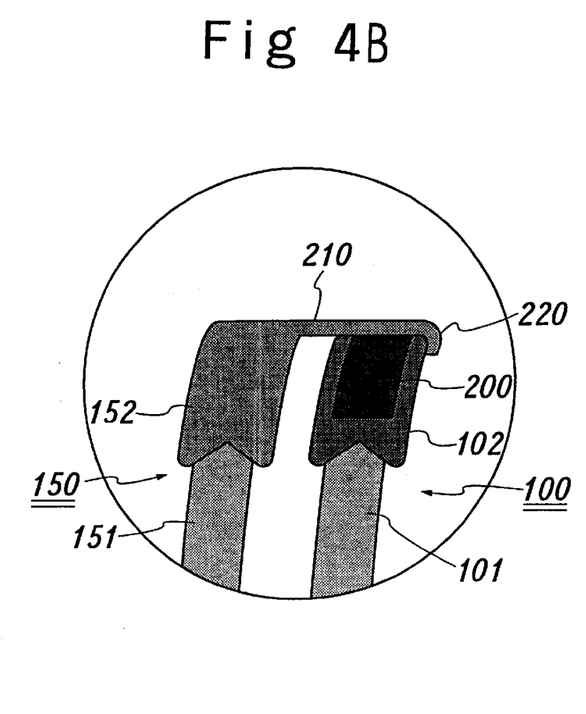
Figure 5:
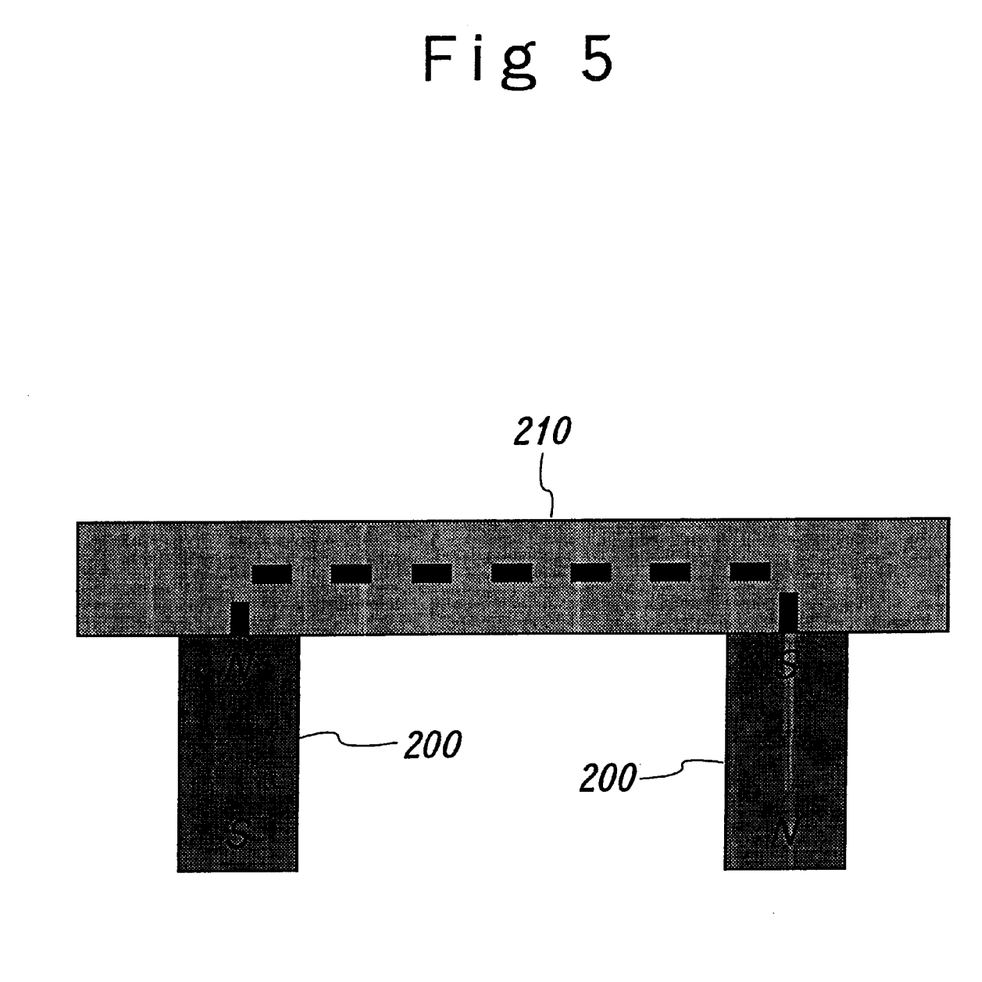
FIG. 5 is a view illustrating magnetic flux distribution between the spectacles and the clip-on sun-shades which are coupled with each other in accordance with the present invention.

FIG. 1 is an exploded perspective view illustrating spectacles and clip-on sun-shades in accordance with a first embodiment of the present invention. FIG. 2 is a cross-sectional view taken along the line A—A of FIG. 1, illustrating a state wherein the spectacles and the clip-on sun-shades are coupled with each other. FIG. 3 is a cross-sectional view illustrating a state wherein spectacles and clip-on sun-shades in accordance with a second embodiment of the present invention are coupled with each other. FIGS. 4A and 4B are enlarged cross-sectional views each illustrating a state wherein spectacles and clip-on sun-shades in accordance with a third embodiment of the present invention are coupled with each other. FIG. 5 is a view illustrating magnetic flux distribution between the spectacles and the clip-on sun-shades which are coupled with each other in accordance with the present invention.

The spectacles 100 have first lens frames 102 which are connected together at their inner ends by a first nose frame 103, lenses 101 which are fitted into respective first lens frames 102, and arms 104 which are mounted to outer ends of the first lens frames 102 through hinges 105. The clip-on sun-shades 150 have second lens frames 152 which are connected together at their inner ends by a second nose frame 153, and tinted lenses 151 which are fitted into respective second lens frames 152.

In the present invention, the spectacles 100 and the clip-on sun-shades 150 are coupled with each other by using soft magnetic members and permanent magnets. For this, as shown in FIGS. 1 and 2, a permanent magnet 200 is disposed to the first nose frame 103 of the spectacles 100, and a thin plate-shaped soft magnetic member 210 constitutes the second nose frame 153 of the clip-on sun-shades 150, whereby the spectacles 100 and the clip-on sun-shades 150 are allowed to be coupled with each other. In this invention, soft magnetic means metal material which act with and adhere onto magnetic such iron based metal, nickel based metal, The permanent magnet 200 and the soft magnetic member 210 are not limited to the first and second nose frames 103 and 153. Instead, as shown in FIG. 3, the permanent magnet 200 and the soft magnetic member 210 can be used to constitute the first and second lens frames 102 and 152 or fastening pieces for fastening lenses 101 and 151 which are fitted in the first and second lens frames 102 and 152, respectively.

While, in the illustrated embodiment, the permanent magnet 200 is disposed to the spectacles 100 and the soft magnetic member 210 constitutes the clip-on sun-shades 150, persons skilled in the art will appreciate that the permanent magnet 200 may be disposed to the clip-on sun-shades 150 and the soft magnetic member 210 may constitute the spectacles 100.

Furthermore, as shown in FIG. 4, the soft magnetic member 210 which is able to constitute the spectacles 100 or the clip-on sun-shades 150, can be formed integrally with a release-preventing piece 220 which prevents the clip-on sun-shades 150 coupled to the spectacles 100 from being inadvertently uncoupled therefrom.

Of course, contours of the permanent magnet 200, soft magnetic member 210 and release-preventing piece 220 vary depending upon configurations of the spectacles 100 and clip-on sun-shades 150 and their positional arrangement. That is to say, the permanent magnet 200, soft magnetic member 210 and release-preventing piece 220 can have straight line-shaped, bent, rounded or curved contours.

As described above, in the present invention, when it is required to protect eyes from ultraviolet rays while wearing spectacles 100, the clip-on sun-shades 150 can be coupled to the spectacles 100 in front of the spectacles 100 in a state wherein the spectacles 100 are already being worn on the user's face. Accordingly, the inconvenience of having to wear separate spectacles is eliminated.

Namely, if the clip-on sun-shades 150 are coupled to the spectacles 100 in front of the spectacles 100, the permanent magnet 200 which is disposed at a predetermined position on one of the spectacles 100 or the clip-on sun-shades 150 and the soft magnetic member 210 which is disposed at a preset position on the other of the spectacles 100 or the clip-on sun-shades 150, are coupled with each other. By this, it is possible to continuously maintain the coupled state of the spectacles 100 and the clip-on sun-shades 150. The predetermined and preset positions can be defined on the first and second nose frames 103 and 153, first and second lens frames 102 and 152, the connection piece, etc.

In the case that the permanent magnet 200 and the soft magnetic member 210 are coupled with each other, as shown in FIG. 5 which is a view illustrating magnetic flux distribution between the spectacles and the clip-on sun-shades which are coupled with each other in accordance with the present invention, magnetic flux which is generated from the North pole N or the South pole S of the permanent magnet 200 which is coupled to the soft magnetic member 210 is focused to the South pole S or the North pole N of the permanent magnet 200 through the soft magnetic member 210, to enable the spectacle 100 and the clip-on sun-shades 150 to be coupled to each other with stronger magnetic force.

In other words, the soft magnetic member 210 which is coupled to the permanent magnet 200, serves as a magnetic closed circuit for magnetic flux, thereby preventing magnetic flux from being lost and increasing coupling force.

Moreover, by the release-preventing piece 220 which is integrally formed with the soft magnetic member 210, the clip-on sun-shades 150 are prevented from being undesirably uncoupled from the spectacles 100. Also, because the soft magnetic member 210 is made of thin plate-shaped metal segment and only one permanent magnetic 200 is used, vigorous activity or exercise can be ensured while the spectacles 100 are worn on the user's face, lightweight of the spectacles 100 and the clip-on sun-shades 150 can be achieved, and manufacturing procedures can be implemented in an easy manner.

Figure 7:
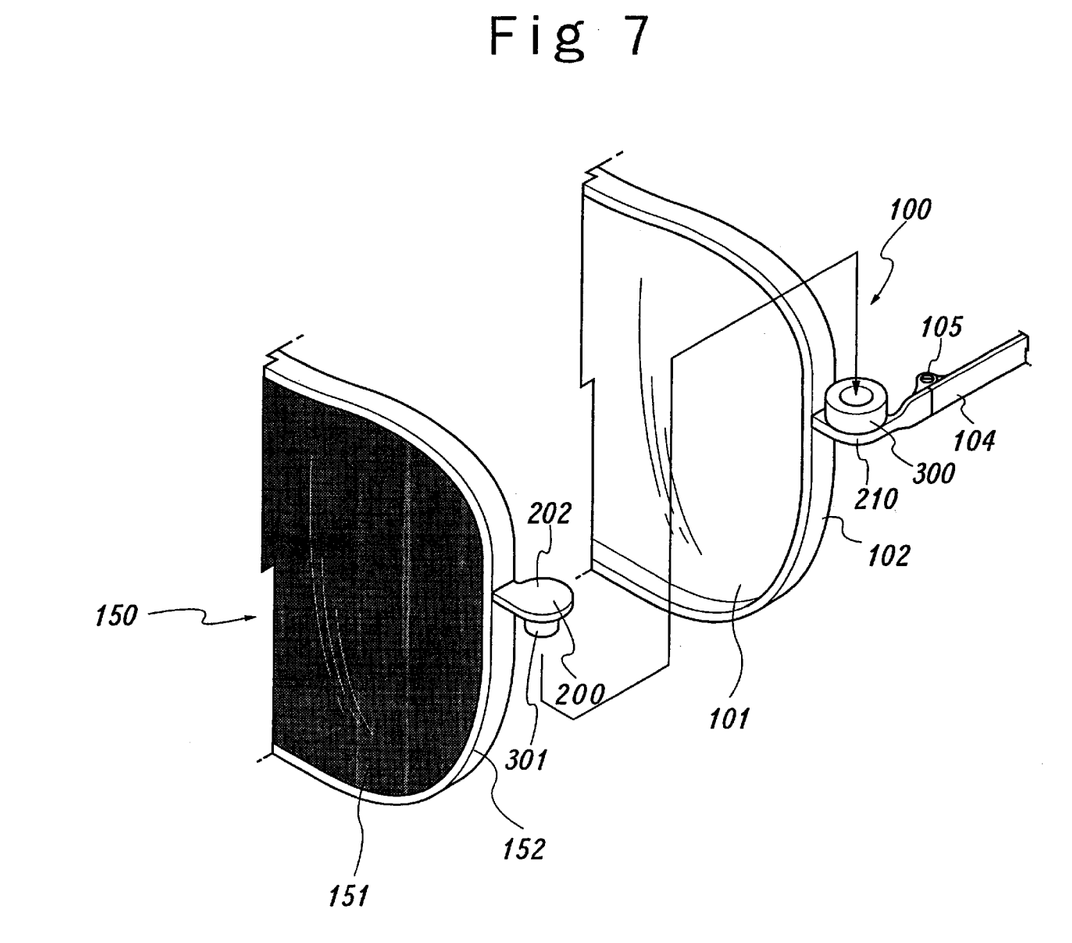
FIG. 7 is an exploded partial perspective view illustrating spectacles and clip-on sun-shades in accordance with other embodiment of the present invention.
Figure 8:
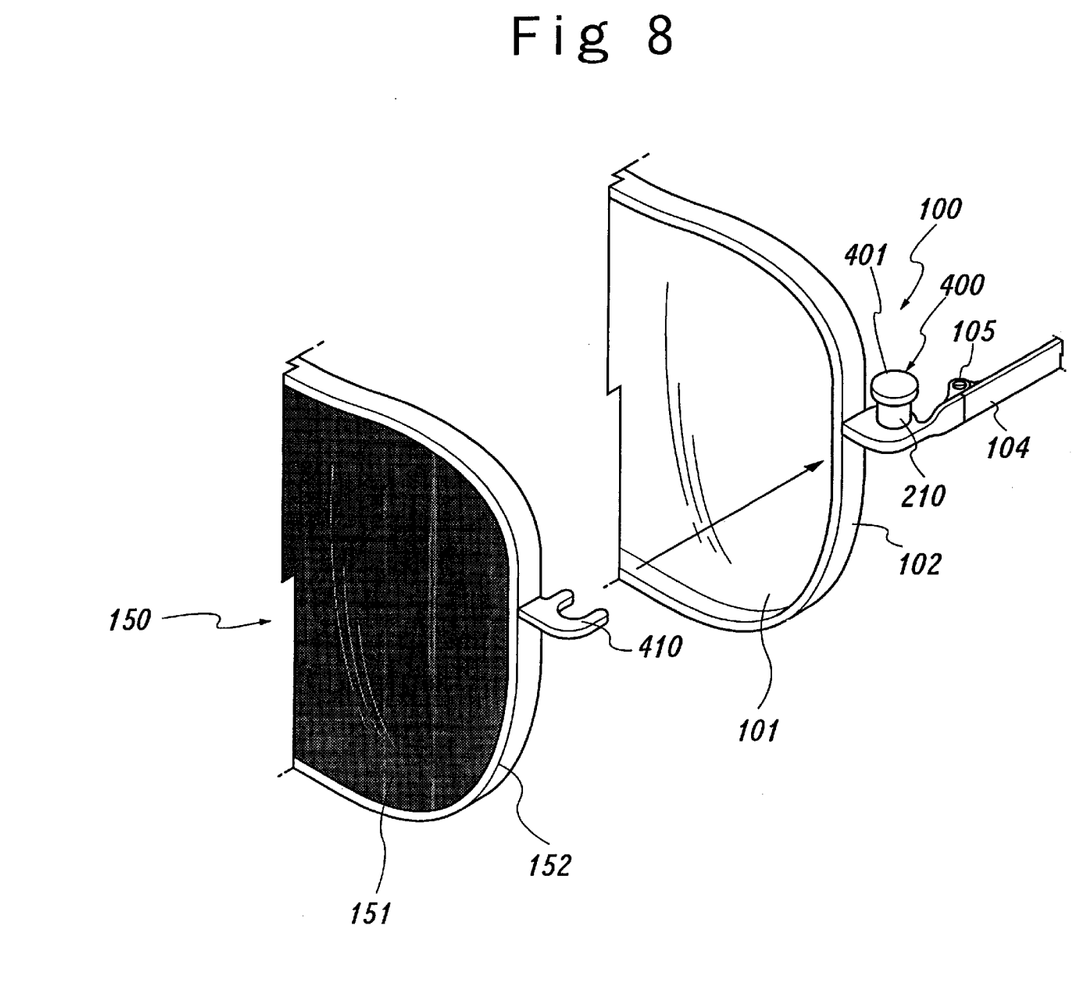
FIG. 8 is an exploded partial perspective view illustrating spectacles and clip-on sun-shades in accordance with other embodiment of the present invention.

FIGS. 7, 8, 9 show other embodiments of this invention having the same basic idea and notation and easily contrived with the reference of the above embodiment.

Figure 6:
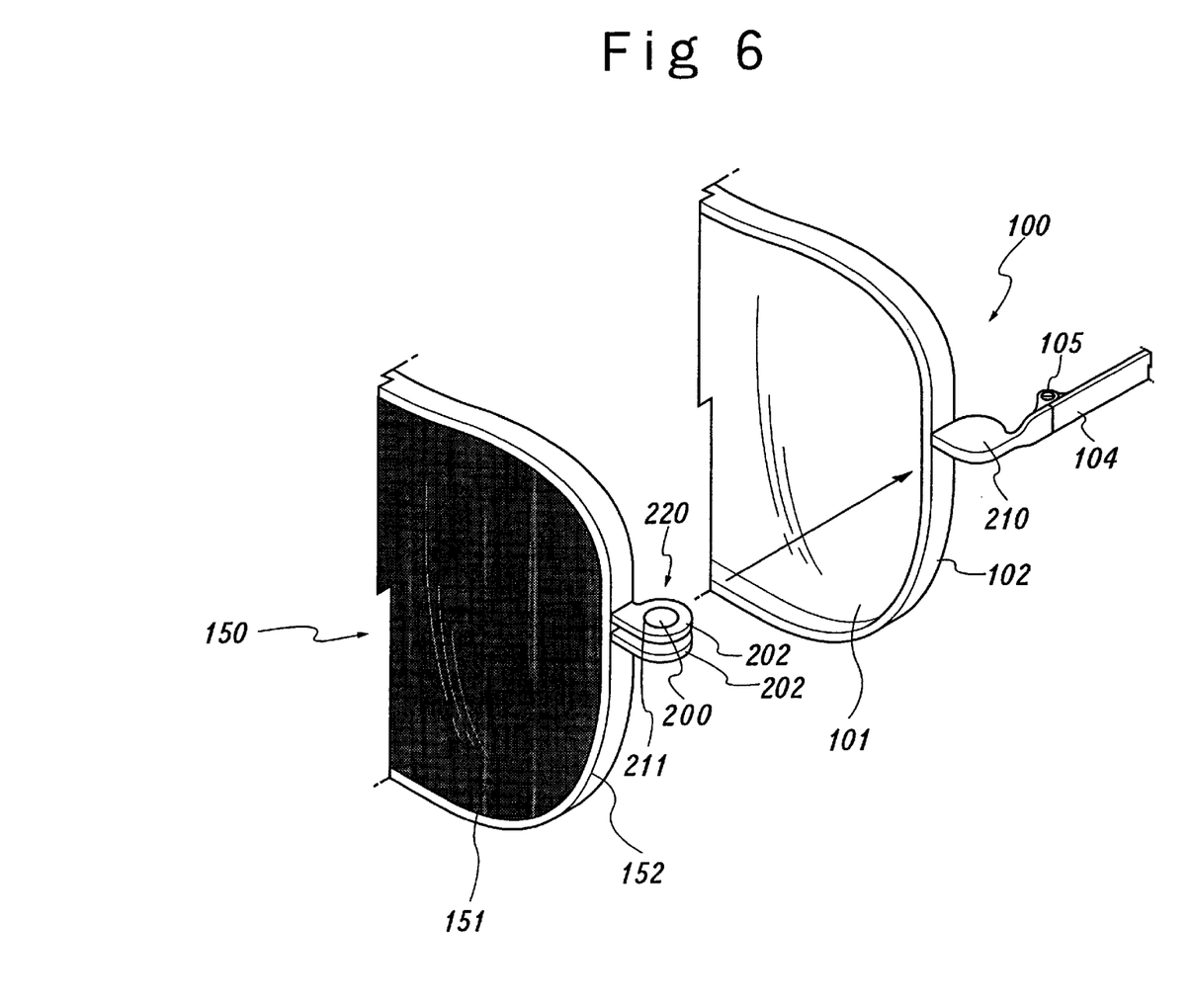
FIG. 6 is an exploded partial perspective view illustrating spectacles and clip-on sun-shades in accordance with another embodiment of the present invention.

Embodiment of FIG. 6 shows the above magnetic apparatus is made on the fronatal hinge assembly which connects the lens frame 102 and arms 104. The frontal hinge member 210 of lens frame 102 is made of soft magnet and the corresponding hinge member 220 of sun-shades 150 is consisted of one or more extruded plates 202,202, . . .

One or more extruded plates 202,202, . . . contain(s) permanent magnet 200 in magnet hole 211 to make a closed loop of magnetic flux as shown in FIG. 10. In this embodiment, Places like frontal hinge member 210 of lens frame 102 where soft magnetic is used can be substituted with permanent magnetic member and vice versa, and can be fully magnetized by special device like magnetizer instead of inserting individual permanent magnet 200.

Another embodiment shown in FIG. 7 has the same notation with that of FIG.6 but has different structure of hinge member. There is provided a receiving member 300 shaped a piece of tube opend upward and made of soft magnet on the frontal hinge 210 to receive the inserting member 301 of corresponding extruded plate 202 of sun-shades 150. The inserting member 301 is made of permanent magnet or magnetized itself and extruded downward to be inserted into the receiving member 300. The two corresponding members of the receiving member 300 and inserting member 301 can be substituted with each other.

FIG. 8 shows clip-on sun-shades in accordance with other embodiment of the present invention having the same notation with that of FIG.6 but has different structure of hinge member. In this embodiment, there is provided a receiving extruder 400 of soft magnet, shaped an extruded button upward and has stopper head 401 to receive the inserting member 410 shaped a "hook" and made of permanent magnet. The same structure of this embodiment easily adapted between nose frames of clip-on sun-shades and spectacles.

As aforementioned above, according to the present invention, advantages are provided in that spectacles and clip-on sun-shades are easily coupled with each other, manufacturing and assembling procedures of coupling means are simplified, and costs of the spectacles and clip-on sun-shades are reduced, whereby productivity and quality of the spectacles and clip-on sun-shades are enhanced, the clip-on sun-shades coupled to the spectacles are effectively prevented from being undesirably uncoupled from the spectacles, and user convenience is improved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for coupling spectacles and clip-on sun-shades with each other, the spectacles having first lens frames connected together at their inner ends by a first nose frame, lenses fitted into respective first lens frames and arms mounted to outer ends of the first lens frames through hinges, the clip-on sun-shades having second lens frames connected together at their inner ends by a second nose frame and tinted lenses fitted into respective second lens frames, the method comprising the steps of:

disposing a permanent magnet to one of the spectacles and the clip-on sun-shades at a predetermined position;

disposing a soft magnetic member to the other of the spectacles and the clip-on sun-shades at a preset position in a manner such that the soft magnetic member faces the permanent magnet; and mating the permanent magnet and the soft magnetic member with each other.

2. A device for coupling spectacles and clip-on sun-shades with each other, the spectacles having first lens frames connected together at their inner ends by a first nose frame, lenses fitted into respective first lens frames and arms mounted to outer ends of the first lens frames through hinges, the clip-on sun-shades having second lens frames connected together at their inner ends by a second nose frame and tinted lenses fitted into respective second lens frames, the device comprising:

a permanent magnet disposed to one of the spectacles and the clip-on sun-shades at a predetermined position; and a soft magnetic member disposed to the other of the spectacles and the clip-on sun-shades at a preset position in a manner such that the soft magnetic member can be mated with the permanent magnet thereby to couple the spectacles and the clip-on sun-shades with each other.

3. The device as claimed in claim 2, wherein the soft magnetic member disposed to the other of the spectacles and the clip-on sun-shades is formed integrally with a release-preventing piece for preventing the clip-on sun-shades from being uncoupled.

4. The device as claimed in claim 2, wherein contours of the permanent magnet, soft magnetic member and release-preventing piece vary depending upon configurations of the spectacles and the clip-on sun-shades and their positional arrangement.

5. A device for coupling spectacles and clip-on sun-shades with each other, the spectacles having first lens frames connected together at their inner ends by a first nose frame, lenses fitted into respective first lens frames and arms mounted to outer ends of the first lens frames through hinges, the clip-on sun-shades having second lens frames connected together at their inner ends by a second nose frame and tinted lenses fitted into respective second lens frames, the device comprising:

a frontal hinge member 210 of lens frame 102 made of soft magnet;

a corresponding hinge member 220 of sun-shades 150 consisted of one or more extruded plates 202 contain(s) permanent magnet 200 in magnet hole 211 to make a closed loop of magnetic flux.

6. The device as claimed in claim 5, wherein the two corresponding material of soft magnet and permanent magnet can be adopted on the two corresponding members of the receiving members and inserting members selectively.

7. A device for coupling spectacles and clip-on sun-shades with each other, the spectacles having first lens frames connected together at their inner ends by a first nose frame, lenses fitted into respective first lens frames and arms mounted to outer ends of the first lens frames through hinges, the clip-on sun-shades having second lens frames connected together at their inner ends by a second nose frame and tinted lenses fitted into respective second lens frames, the device comprising:

a receiving member 300 shaped a piece of tube opend upward and made of soft magnet on the frontal hinge 210, an inserting member 301 of corresponding extruded plate 202 of sun-shades 150 and made of permanent magnet or magnetized itself and extruded downward to be inserted into the receiving member 300.

8. A device for coupling spectacles and clip-on sun-shades with each other, the spectacles having first lens frames connected together at their inner ends by a first nose frame, lenses fitted into respective first lens frames and arms mounted to outer ends of the first lens frames through hinges, the clip-on sun-shades having second lens frames connected together at their inner ends by a second nose frame and tinted lenses fitted into respective second lens frames, the device comprising:

a receiving extruder 400 of soft magnet, shaped an extruded button upward and h as stopper head 401, an inserting member 410 shaped a hook and made of permanent magnet to be inserted into the above receiving extrude 400.

* * * * *